June 22, 1965     C. H. SPANGLER     3,190,027
ROD SUPPORTED FISHING FLY HOLDER
Filed Dec. 4, 1961
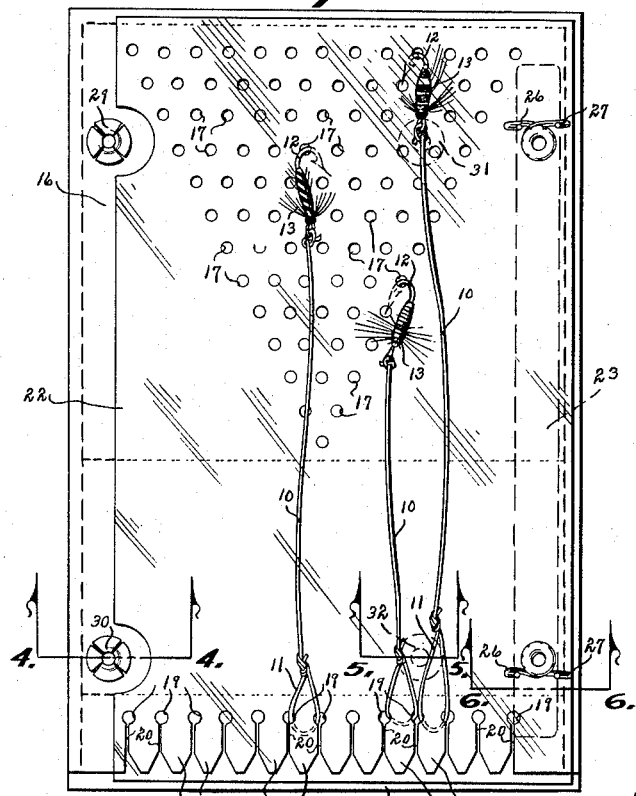
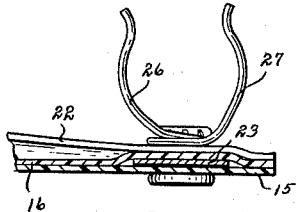
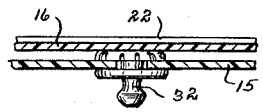
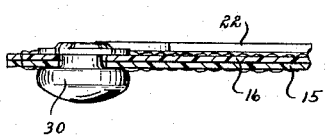
INVENTOR
CALEB H. SPANGLER
BY Talbert Dick & Earley
ATTORNEYS
WITNESS
NORMAN G. TRAVISS

United States Patent Office 3,190,027
Patented June 22, 1965

3,190,027
ROD SUPPORTED FISHING FLY HOLDER
Caleb H. Spangler, 615 Cherry St., Des Moines, Iowa
Filed Dec. 4, 1961, Ser. No. 156,723
3 Claims. (Cl. 43—25.2)

This invention relates to a fishing fly holder and more particularly to one that may easily be attached to or removed from a fishing rod, fishing pole or like.

One of the most difficult tasks sometimes encountered in fishing, and one that greatly reduces the pleasure derived from fishing, is the changing of fly lures. Such fly lures consist of a leader, a loop at one end of the leader, a hook at the other end of the leader, and an artificial insect or like fish-attracting means embracing the shaft portion of the hook. Due to the fact that the flies get wet after several casts, and also because the fisherman wishes to try out various shapes, colors, and characters of flies, the flies are constantly being changed onto and off of the fishing line. Inasmuch as flies are relatively small and easily tangle with each other, it becomes a problem to hold and carry them during a fishing expedition. Some fishermen attempt to carry a plurality of selectable flies on their hats. This, however, is objectionable in that a hat may not properly hold the flies, and for the further reason that the hat must be removed to select a lure, and/or to place a lure onto the heat. Some fishemen keep the flies in a container kept in the pocket of the fisherman. The objection to this method is that the flies may become tangled with each other and for the further reason that it may require both hands to open the container and obtain a lure therefrom.

Therefore one of the principal objects of my invention is to provide an easily opened fly lure case which may be attached to and supported by the shaft portion of a fishing rod or like.

A further object of this invention is to provide a fishing lure holding case that may be easily and quickly attached onto or removed from a fishing rod or pole.

A still further object of this invention is to provide a lure holding means usable with a fishing rod that will protect the lures from the elements.

A still further object of this invention is to provide a rod supported fly lure case that permits easy removal or replacement of the flies.

A still further object of this invention is to provide a fly lure holding means for use on a fishing rod that prevents the flies therein from getting tangled with each other.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a plan view of my fly lure holder;

FIG. 2 is a reduced plan view of my case secured to the shaft of a fishing rod, pole or like;

FIG. 3 is a reduced perspective view of my device in closed condition on the shaft of a fishing rod;

FIG. 4 is a fragmentary enlarged cross-sectional view of the case in the vicinity of one of the snap buttons taken on line 4—4 of FIG. 1;

FIG. 5 is a fragmentary enlarged cross-sectional view of the case in the vicinity of one of the snap button receiving lugs; and FIG. 6 is a fragmentary enlarged cross-sectional view of the case in the vicinity of one of the spring jaw clamps for detachably securing the device to a fishing rod or like.

My device is for holding a plurality of fly lures, each having a leader 10, a loop 11 on one end of the leader, a hook 12 on the other end of the leader, and fly portion 13 embracing the shaft of the hook. The numeral 15 designates a flexible rectangular back sheet of suitable material such as leather, imitation leather, plastic, fabric, or like. Sewed onto the open face of the back 15 is the fly holding sheet 16 which also is of suitable flexible sheet material. In the upper half of the sheet 16 are a plurality of spaced apart hook receiving holes 17.

In the lower portion of the sheet 16 is a horizontal row of holes designated by the numeral 19. Each hole 19 has a slit or cut connecting it with the bottom free edge of the sheet 16. By this construction each pair of adjacent slots 20 creates a downwardly extending tongue 21. The lower end of each tongue 21 should be rounded as shown in FIG. 1. If desired, a third or cover sheet 22 may be placed over the open face of the sheet 16 and secured at its right side edge to the sheets 15 and 16. This third sheet 22 should be transparent. A stiffening or strengthening bow rib 23 may be installed at the right side of the unit. Secured to this right side of the unit are two spaced apart spring means for detachably yieldingly holding the unit to the shaft 25 of a fishing rod, pole or like. Each spring holding means has two spring rod jaws 26 and 27 for yieldingly embracing the rod shaft as shown in FIG. 2. By this arrangement of parts my unit may be quickly snapped onto or off of shafts of various diameters. On the left side portion of the sheets 15 and 16 are two spaced apart snap-on buttons 29 and 30. These buttons extend through the sheets 15 and 16 with their open ends to the front face of the sheets 15 and 16 to receive and snap onto the two lugs 31 and 32 on the back side of the back sheet 15. The sheets must be wrapped around the rod shaft as shown in FIG. 3 before the holding snap-on buttons are fastened. With the unit wrapped around the rod shaft, it and the flies it is holding will be a relatively compact small package that will not interfere with the normal use of the rod. To place a fly lure on the unit, it is opened as shown in FIG. 2, the transparent sheet 22 is rolled back, the loop 11 is hooked around a tongue 21, the leader stretched upwardly and its hook 12 inserted into a hole 17. The holes 17 are arranged at various heights to accommodate leaders of different lengths. The installed lures are shown in FIG. 1. To remove a lure, it is merely necessary to remove its hook from the hole 17, and detach its loop 11 from the holding tongue 21. After the lure or lures have been removed or replaced, the unit is re-wrapped around the rod and the snap-on buttons fastened. When the flies are so encased they are protected from the elements. The lures are always separately held and never get tangled. The case may be unsnapped and a lure removed by only one hand. The holes 19 at the tops of the slits 20, respectively, not only accommodate the loop strand of the leader, but prevent the loop strand from cutting the holding sheet 16.

Some changes may be made in the construction and arrangement of my combination fishing fly holder and rod without departing from the real spirit and purpose of my invention, and it is my intention to cover by my claims, any modified forms of structure or use of mechanical equivalents which may be reasonably included within their scope.

I claim:

1. In a holder for fish hooks having a hook portion and a leader attached at one of its ends to said hook portion, said leader having a loop at its other end, a rectangular flexible sheet member having opposite sides and opposite ends, said flexible sheet member having formed therein a plurality of holes for receiving said hook portions of said fish hooks, a plurality of securing means on said flexible sheet member adapted to receive the loops of said leaders, means on said sheet member for securing said sheet member adjacent one of its sides to an elongated fishing rod,
and means on said sheet member for detachably holding said flexible sheet member in a wrapped condition around said fishing rod so that said fish hooks are encased by said wrapped sheet member.

2. In a holder for fish hooks having a hook portion and a leader attached at one of its ends to said hook portion, said leader having a loop at its other end,
a rectangular flexible sheet means comprised of a first flexible sheet member having a second flexible sheet member secured by at least two of its edges to said first sheet member and being in a coextensive relationship therewith,
said second sheet member having formed therein a plurality of holes for receiving said hook portions of said fish hooks,
a plurality of securing means on said second sheet member adapted to receive the loops of said leaders,
means on said sheet means for securing said sheet means adjacent one of its sides to a fishing rod,
and means on said sheet for detachably holding said flexible sheet means in a wrapped condition around said fishing rod so that said fish hooks are encased by said wrapped sheet means.

3. In a holder for fish hooks having a hook portion and a leader attached at one of its ends to said hook portion, said leader having a loop at its other end,
a flexible sheet member having a plurality of holes formed therein adapted to receive said hook portions of said fish hooks,
a plurality of tongue portions formed along one edge of said sheet member which are adapted to receive the loops of said leaders,
said tongues formed by a plurality of spaced apart strand receiving cuts in said sheet member communicating with holes in said member located at the inner end portions of said cuts,
means on said sheet member for securing said sheet member to a fishing pole,
and means on said sheet member for detachably holding said flexible sheet member in a wrapped condition around said fishing pole so that said fish hooks are encased by said wrapped sheet member.

References Cited by the Examiner
UNITED STATES PATENTS

| | | | |
|---|---|---|---|
| 435,094 | 8/90 | Hewitt | 43—57.5 |
| 595,998 | 12/97 | Garland | 43—57.5 |
| 940,132 | 11/09 | Creasey | 43—57.5 |
| 1,076,894 | 10/13 | Langbein | 43—57.5 |
| 1,490,370 | 4/24 | Figley | 43—57.5 |
| 1,736,343 | 11/29 | Hawes | 43—57.5 |
| 2,242,521 | 5/41 | Heiner | 43—57.5 |
| 2,865,128 | 12/58 | Fallert | 43—25.2 |

FOREIGN PATENTS

| | | |
|---|---|---|
| 451,165 | 9/48 | Canada. |
| 3,025 | 1909 | Great Britain. |
| 698,318 | 10/53 | Great Britain. |

SAMUEL KOREN, *Primary Examiner.*
ABRAHAM G. STONE, JOSEPH S. REICH, *Examiners.*